United States Patent

Nickels et al.

[15] 3,648,606

[45] Mar. 14, 1972

[54] BRAKE MECHANISM FOR PRINTING WHEEL

[72] Inventors: James J. Nickels; Tennis Mahoney; Harry L. Hart, all of Fort Wayne, Ind.

[73] Assignee: Lincoln Logotype Co., Inc., Fort Wayne, Ind.

[22] Filed: Dec. 22, 1969

[21] Appl. No.: 887,213

[52] U.S. Cl. .............................. 101/375, 101/35, 101/109, 101/210, 188/71.1, 188/83
[51] Int. Cl. ........................................................ B41f 13/10
[58] Field of Search ..................... 188/71.1, 71.7, 83, 71.3; 85/155; 151/24; 242/156, 147; 101/35, 109, 210, 375

[56] References Cited

UNITED STATES PATENTS

| | | | |
|---|---|---|---|
| 2,760,736 | 8/1956 | Mihalko et al. | 188/83 X |
| 2,873,789 | 2/1959 | Ditter et al. | 188/83 X |
| 3,327,624 | 6/1967 | Beaver | 101/35 |
| 2,373,225 | 4/1945 | Clickner | 188/83 X |
| 3,501,993 | 3/1970 | Swenson | 85/1 SS |

*Primary Examiner*—George E. A. Halvosa
*Attorney*—Hood, Gust, Irish & Lundy

[57] ABSTRACT

A printing wheel is provided rotatably mounted on a shaft which has a portion extending outwardly from a surface of the wheel. Apparatus is provided for indexing the wheel, including a mechanism which resiliently urges the wheel to a given rotational position with respect to the shaft. A brake mechanism is provided for preventing the wheel from oscillating about the given position and being returned thereto from another rotational position by the indexing apparatus. The brake mechanism includes a washer of feltlike material surrounding the shaft extension and engaging the surface of the wheel from which the shaft extension projects. The shaft extension has a threaded section and a pressure plate member is positioned thereon engaging the washer. The pressure plate member has a plurality of radially spaced, radially extending, internally threaded bores formed therein extending between the threaded section of the shaft and the peripheral surface of the pressure plate member. A plurality of setscrews are provided respectively threadingly seated in the bores and having inner ends. Nylon elements are interposed between the inner ends of the setscrews and the threaded section of the shaft, so that upon tightening of the setscrews, the nylon elements are indented into the threads of the threaded section to provide selective adjustment of the pressure plate member, thereby to press the washer into engagement with the surface of the wheel so as to permit rotation of the wheel with respect to the shaft while preventing oscillation of the wheel about its given position, the setscrews and nylon elements further resisting loosening of the pressure plate during operation of the wheel.

6 Claims, 4 Drawing Figures

Patented March 14, 1972
3,648,606
2 Sheets-Sheet 1
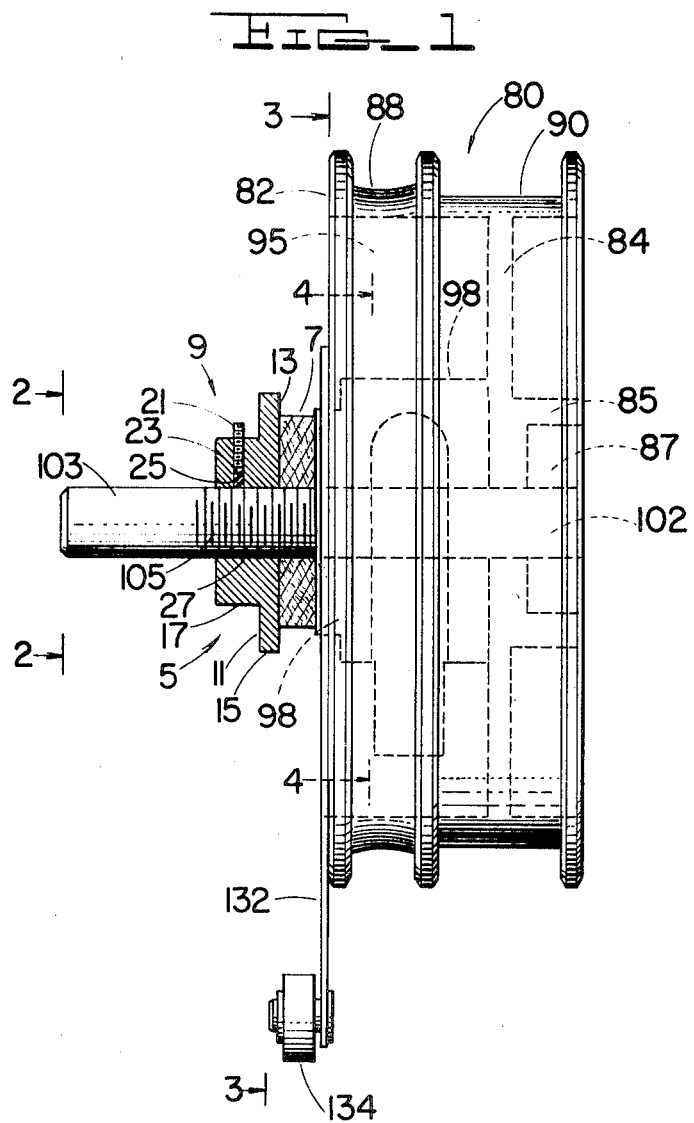
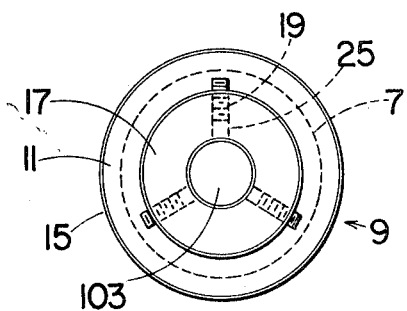
INVENTORS
JAMES J. NICKELS
TENNIS MAHONEY
HARRY L. HART
BY Ward, Gust, Irish & Lundy
ATTORNEYS Patented March 14, 1972
3,648,606
2 Sheets-Sheet 2
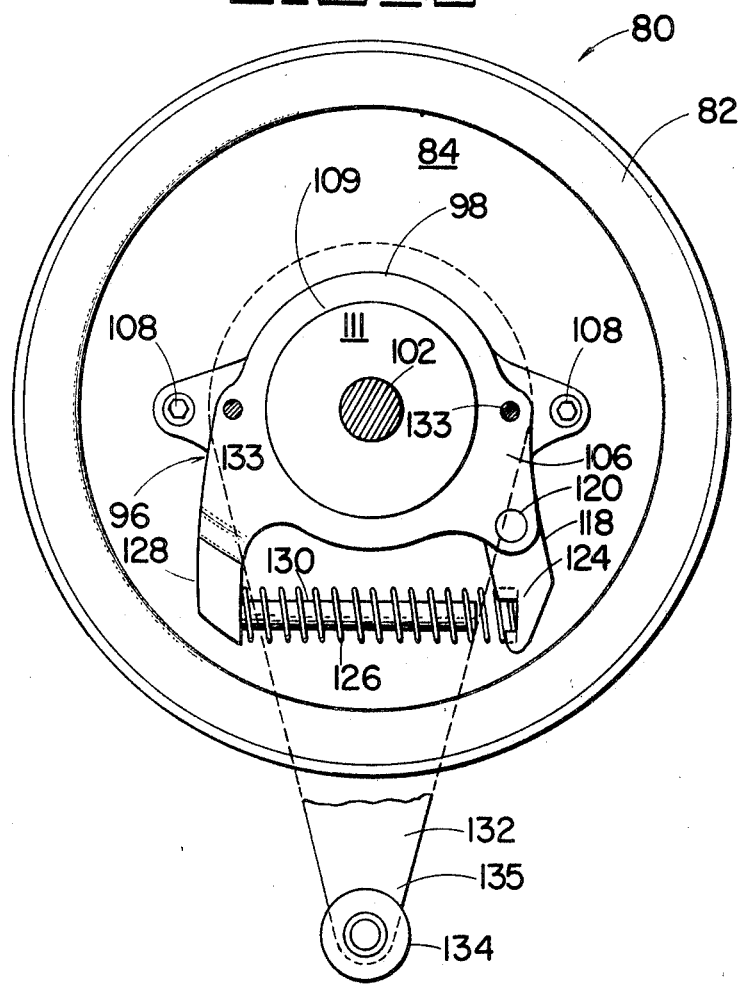
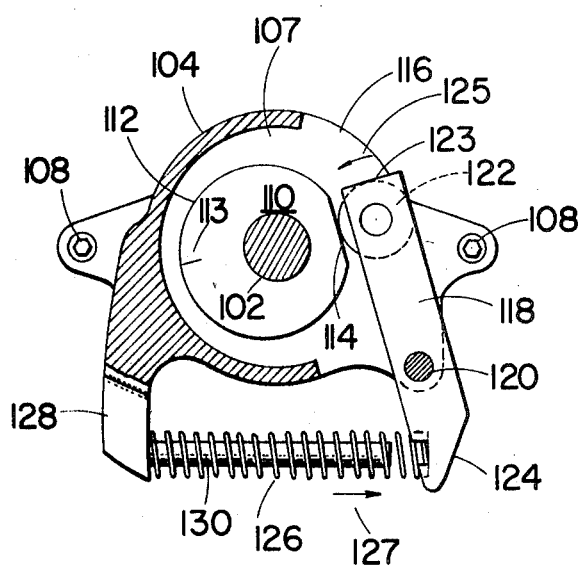
INVENTORS
JAMES J. NICKELS
TENNIS MAHONEY
HARRY L. HART
BY Wood, Guest, Irish & Lundy
ATTORNEYS

3,648,606

BRAKE MECHANISM FOR PRINTING WHEEL

BACKGROUND OF THE INVENTION

1. Field of the Invention

This invention relates generally to a member, such as a printing wheel, rotatably mounted upon a shaft and having means for resiliently urging the member to a given rotational position with respect to the shaft, and more particularly to a braking mechanism for preventing oscillation of such a member about the given rotational position upon being returned thereto from another rotational position by the urging means.

2. Description of the Prior Art

U.S. Pat. No. 3,327,624 to Millard B. Beaver, assigned to the assignee of the present application, discloses marking apparatus for imprinting characters upon articles, such as cartons or boxes, as the same are being moved in succession by a conveyor. The apparatus of the Beaver patent includes a printing wheel rotatably mounted upon a shaft and an indexing mechanism which, among other things, resiliently urges the wheel to a given rotational position with respect to the shaft.

By reason of the mass-spring relationship of the printing wheel and the spring which forms a part of the mechanism for resiliently returning the wheel to its given position, there is a tendency for the wheel to oscillate or hunt about its given position upon being returned thereto by the indexing mechanism. While such oscillation or hunting is not objectionable for relatively low speed operation of the apparatus, it is troublesome in the case of high speed production lines where the articles being imprinted are closely spaced in successive relation upon the conveyor and the conveyor is being operated at relatively high speed, since such oscillation or hunting of the wheel may cause the characters to be printed at the wrong location on a particular article.

It is therefore desirable to provide a braking mechanism for use with a printing wheel of the type shown in the aforesaid Beaver patent which will prevent such oscillation or hunting about the position of the wheel to which it is returned by the indexing mechanism.

SUMMARY OF THE INVENTION

The invention, in its broader aspects, provides a braking mechanism for use in combination with a member rotatably mounted upon a shaft and having means for resiliently urging the member to a given rotational position with respect to the shaft, the braking mechanism serving to prevent the member from oscillating about its given position upon being returned thereto from another rotational position by the urging means. The braking mechanism comprises a braking member mounted on a portion of the shaft which extends outwardly from the surface of the member, and means for adjustably pressing the braking member into engagement with the surface of the member thereby to permit rotation of the member with respect to the shaft while preventing such oscillation of the member.

It is accordingly an object of the invention to provide a braking mechanism for use with a member rotatably mounted upon a shaft and having means for resiliently urging the member to a given rotational position with respect to the shaft, which will prevent oscillation of the member about its given position upon being returned thereto by the urging means.

Another object of the invention is to provide an improved printing wheel assembly of the type including a mechanism for resiliently urging the wheel to a given rotational position.

The above-mentioned and other features and objects of this invention and the manner of attaining them will become more apparent and the invention itself will be best understood by reference to the following description of an embodiment of the invention taken in conjunction with the accompanying drawings, where:

BRIEF DESCRIPTION OF THE DRAWINGS

FIG. 1 is a side view, partly in cross section, illustrating the braking mechanism of the invention in conjunction with a printing wheel of the type shown in the aforesaid U.S. Pat. No. 3,327,624;

FIG. 2 is an end view taken along the line 2—2 of FIG. 1;

FIG. 3 is a cross-sectional view taken generally along the lines 3—3 of FIG. 1; and FIG. 4 is a cross-sectional view taken generally along the line 4—4 of FIG. 1.

DESCRIPTION OF THE PREFERRED EMBODIMENT

Referring now to the FIGS. of the drawings, for ease in referring to the aforesaid Beaver U.S. Pat. No. 3,327,624, corresponding reference numerals will be used herein. Printing wheel 80 includes a rim portion 82 and a web or rim-supporting portion 84. A hub 85 is formed on one side of web 84 and has a suitable bearing 87 mounted therein which rotatably supports shaft 102, wheel 80 thus being rotatably mounted on shaft 102.

Rim portion 82 of wheel 80 has two circumferentially extending slots 88 and 90 for respectively receiving driving elements and type (not shown), as more fully described in the aforesaid Beaver patent.

Web 84 defines a cavity 95 which receives indexing mechanism 96. Indexing mechanism 96 includes a casing 98 secured to web portion 84, as by screws 108. Casing 98 has a cavity 107 formed therein defined by a generally cylindrical side wall 104 and a front wall 106. An opening 116 in side wall 104 communicates with cavity 107. A hub portion 109 extends forwardly from front wall 106 of casing 98 and has a surface 111 normal to shaft 102, which extends through casing 98. Shaft 102 has an extension portion 103 which projects forwardly from the front surface 111 of hub portion 109. It will be observed that indexing mechanism 96 rotates with wheel 80 about shaft 102.

An eccentric cam 110 is secured to shaft 102 in cavity 107 and has a high portion 112 and a dwell portion 114. A follower arm 118 is positioned in opening 116 and is pivotally mounted on casing 96 by pin 120. The inner end 123 of arm 118 has a cam follower roller 122 rotatably mounted thereon which engages the outer periphery of cam 110. The outer end 124 of arm 118 is engaged by one end of a helical compression spring 126, which has its other end bearing against an arm 128 extending from casing 98. The spring 126 surrounds guide pin 130 secured to and extending from arm 128. It will be observed that spring 126 exerts a force upon end 124 of arm 118, as shown by arrow 127, which pivots inner end 123 of arm 118 in the direction shown by the arrow 125, thereby to maintain roller 122 in engagement with the periphery of cam 110.

A flat, metal indexing arm 132 is secured to front wall 106 of casing 98, as by suitable screws 133, arm 132 projecting beyond the periphery of printing wheel 80 and rotatably carrying a suitable roller 134 in its outer end 135. The function of indexing arm 132 and roller 134 is more fully described in the aforesaid Beaver U.S. Pat. No. 3,327,624. It suffices to say here that roller 134 is engaged by the leading edge of an article to be printed as it is moved along the conveyor, arm 132 thus being rotated thereby to initiate rotation of casing 98 and printing wheel 80 about shaft 102 until the driving elements carried in slot 88 engage the moving article and continue drivingly to rotate the printing wheel, thus causing rotation of cam 110 so that its high portion 112 progressively moves into engagement with cam follower roller 122, and in turn pivoting arm 118 outwardly in the direction opposite arrow 125, so that end 124 compresses spring 126.

When the article being imprinted moves out of driving engagement with the driving elements in slot 88 on wheel 80, the rotational driving force thereby applied to wheel 80 is removed. At this point, due to the cooperative relationship of cam follower roller 122 and cam 110 which has been rotated away from its normal position, as shown in FIG. 4, the spring force exerted by spring 126 in direction 127 on end 124 of arm 118 causes roller 122 to rotate cam 110 and thus casing 98 and wheel 80 back to their normal positions, as shown in FIGS. 3 and 4, the direction of such return rotation depending on whether cam follower roller 122 is on one side or the other of midpoint 113 of high portion 112 of cam 110.

The drawings are generally to scale, and it will be observed that in a specific embodiment illustrated, printing wheel 10 has a diameter of about 5 inches, and a width of about 1¾ inch. Wheel 80 and casing 98 are preferably formed of metal, and spring 126 is required to exert substantial spring force in order to return cam 110, casing 98 and wheel 80 to their normal positions. It will thus be observed that a mass-spring system is provided and consequently, when wheel 80 has been rotated away from its normal position to the region of midpoint 113, upon the rapid return of the wheel to its normal position by spring 126, wheel 80 will tend to oscillate or hunt several times about its normal position before finally coming to rest. As pointed out above, in the case of a rapidly moving conveyor, such oscillation or hunting of the wheel may cause the imprinting of the characters at the wrong location upon the next successive article.

In order to prevent such oscillation or hunting of wheel 80 upon return to its normal position, as above described, a braking mechanism 5 is provided on shaft extension portion 103. Braking mechanism 5 includes an annular washer 7 of compressible material, such as felt, and a pressure plate member, generally indicated at 9. Washer 7 surrounds shaft extension portion 103 and engages front surface 111 of hub portion 109 on casing 98.

Pressure plate member 9 has an annular portion 11 projecting radially outwardly beyond the outer periphery of washer 7, and having a substantially flat surface 13 engaging washer 7, as best seen in FIG. 1. The outer peripheral surface 15 of annular portion 11 is preferably knurled in order to permit manual manipulation of pressure plate 9. Pressure plate 9 has a hub portion 17 extending forwardly from annular portion 11.

Shaft extension 103 has a threaded section 105, the threads preferably being relatively shallow and of relatively small pitch. Hub portion 17 has a plurality (three being shown) of radially spaced-apart, radially outwardly extending, internally threaded bores 19 formed therein extending between threaded section 105 and its outer periphery. Each of the bores 119 has a set screw 21 threadedly seated therein, each of the set screws 21 having an inner end 23 spaced from thread section 105 of shaft extension 103. A deformable element 25 is interposed between the inner end 23 of each set screw 21 and threaded section 105. In a specific embodiment of the invention, elements 25 were nylon balls. Pressure plate 19 has a bore 27 of a size which initially provides a snug but sliding fit on shaft extension 103 thereby to permit initial positioning of pressure plate 9 thereon.

In adjusting the pressure plate 9, set screws 21 are initially loosened so that the pressure plate may be slid onto shaft extension 103 to the position shown in FIG. 1. Set screws 21 are then tightened with a gentle snugness sufficient to indent the elements 25 onto the threads of threaded section 105. Set screws 21 are then backed-off slightly, such as by a quarter turn, and then left in that position. Thus, there will be sufficient engagement between the elements 25 and the threads of threaded section 105 to provide for threaded engagement between pressure plate 9 and shaft extension 103. Pressure plate 9 may then be manually rotated to advance into engagement with washer 7, thereby compressing washer 7 and pressing it into breaking engagement with front surface 111 of hub portion 108 of casing 98. Pressure plate member 9 is thus manually adjusted until the breaking pressure exerted by washer 7 is sufficient to prevent the aforesaid oscillatory or hunting movement of printing wheel 80 upon its being returned to its normal position by indexing mechanism 96.

While there have been described above the principles of this invention in connection with specific apparatus, it is to be clearly understood that this description is made only by way of example and not as a limitation to the scope of the invention.

What is claimed is:

1. In combination with a printing wheel rotatably mounted on a shaft and indexing means for resiliently urging said printing wheel to a predetermined rotational position with respect to said shaft and which tends to cause oscillation of said wheel upon the latter being returned to said position, said shaft having a portion extending outwardly from a surface of said printing wheel, a brake mechanism for preventing said printing wheel from oscillating about said position upon being returned thereto from another rotational position by said indexing means, said brake mechanism comprising a braking member mounted on said shaft extension portion, means for adjustably pressing said braking member into engagement with said surface of said printing wheel thereby to permit rotation of said printing wheel with respect to said shaft while preventing oscillation of said printing wheel, said shaft extension portion having a threaded section and said pressing means comprising a pressure plate axially slideably mounted on said threaded section for selectively adjustable movement toward and away from said surface of said member, said pressure plate including means threadingly engaging said threaded section thereby providing said selectively adjustable movement, said braking member being disposed between said surface and said pressure plate, and said braking member comprising an annulus of compressible braking material surrounding said shaft extension portion.

2. The mechanism of claim 1 wherein said threadingly engaging means comprises at least one radially extending internally threaded bore formed in said pressure plate member and extending between said threaded section of said shaft and an exterior surface of said pressure plate member, a set screw threadingly seated in said bore and having an inner end, and a deformable element interposed between said inner end of said set screw and said threaded section of said shaft whereby tightening of said set screw causes said element to indent upon the threads of said threaded section thereby resisting movement of said pressure plate away from its selected position.

3. The mechanism of claim 2 wherein said element is formed of plastic material.

4. The mechanism of claim 2 wherein said threaded section comprises relatively shallow threads of relatively fine pitch thereby providing for fine adjustment of said pressure plate member.

5. The mechanism of claim 1, said wheel surface being substantially flat and normal to said shaft, said pressure plate including a first annular portion having a substantially flat surface normal to said shaft which engages said braking member, said first annular portion having a diameter greater than that of said braking member and being adapted for manual manipulation thereby to adjust the position of said pressure plate, and a second annular hub portion joined to said first annular portion, said threadedly engaging means including a plurality of radially spaced-apart, radially extending internally threaded bores therein extending between said threaded section of said shaft and the peripheral surface of said hub portion, each of said bores having a set screw threadingly seated therein, each of said set screws having an inner end, each of said bores further having a deformable element therein interposed between the inner end of the respective set screw and said threaded section of said shaft whereby tightening of said set screws causes said elements to indent upon the threads of said threaded section thereby resisting movement of said pressure plate away from its selected position.

6. The mechanism of claim 5 wherein said elements are formed of nylon, said braking member being formed of felt-like material, said threaded section comprising relatively shallow threads of relatively fine pitch thereby providing for fine adjustment of said pressure plate member.

* * * * *